United States Patent
Kim et al.

(10) Patent No.: US 9,515,781 B2
(45) Date of Patent: Dec. 6, 2016

(54) METHOD AND APPARATUS FOR TRANSMITTING ACKNOWLEDGEMENT

(71) Applicant: LG ELECTRONICS INC., Seoul (KR)

(72) Inventors: Hakseong Kim, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 1 day.

(21) Appl. No.: 14/419,628

(22) PCT Filed: Aug. 9, 2013

(86) PCT No.: PCT/KR2013/007217
§ 371 (c)(1),
(2) Date: Feb. 4, 2015

(87) PCT Pub. No.: WO2014/025237
PCT Pub. Date: Feb. 13, 2014

(65) Prior Publication Data
US 2015/0215080 A1    Jul. 30, 2015

Related U.S. Application Data

(60) Provisional application No. 61/681,612, filed on Aug. 9, 2012.

(51) Int. Cl.
*H04L 1/18* (2006.01)
*H04W 72/04* (2009.01)

(52) U.S. Cl.
CPC .......... *H04L 1/1861* (2013.01); *H04L 1/1858* (2013.01); *H04L 1/1896* (2013.01); *H04W 72/0413* (2013.01)

(58) Field of Classification Search
None
See application file for complete search history.

(56) References Cited

U.S. PATENT DOCUMENTS

| | | | |
|---|---|---|---|
| 8,824,347 B2* | 9/2014 | Pelletier | H04L 1/1883 370/252 |
| 9,112,656 B2* | 8/2015 | Ouchi | H04W 72/042 |
| 9,112,658 B2* | 8/2015 | Arai | H04L 5/0053 |
| 9,179,458 B2* | 11/2015 | Park | H04L 1/1861 |
| 2009/0207781 A1* | 8/2009 | Sidi | H04L 1/1819 370/328 |
| 2011/0194499 A1* | 8/2011 | Aiba | H04L 1/1822 370/328 |
| 2011/0216715 A1* | 9/2011 | Lundgren | H04L 27/2646 370/329 |

(Continued)

FOREIGN PATENT DOCUMENTS

| | | |
|---|---|---|
| KR | 10-0715204 | 5/2007 |
| KR | 10-2010-0045860 | 5/2010 |
| WO | 2010/101411 | 9/2010 |

OTHER PUBLICATIONS

Samsung, "HARQ-ACK Multiplexing in PUSCH for "Mode a" and "Mode b" in TDD," 3GPP TSG RAN WG1 #65, R1-111454, May 2011, 6 pages.

(Continued)

*Primary Examiner* — Hong Cho
(74) *Attorney, Agent, or Firm* — Lee, Hong, Degerman, Kang & Waimey

(57) ABSTRACT

Provided is a method for transmitting hybrid automatic repeat request (HARQ) positive acknowledgement (ACK)/negative acknowledgement (NACK) in a wireless communication system, and a wireless device using the same. The wireless device receives information on the number of repetitions m (where m is an integer greater than 1) from a base station. The wireless device transmits a designated signal p times (where p is an integer greater than 0), and repeatedly transmits ACK/NACK on a downlink transmission block m-p times.

12 Claims, 27 Drawing Sheets

(56) References Cited

U.S. PATENT DOCUMENTS

| | | | |
|---|---|---|---|
| 2011/0305213 A1* | 12/2011 | Lohr | H04L 1/1887 370/329 |
| 2012/0039285 A1* | 2/2012 | Seo | H04L 1/1671 370/329 |
| 2012/0039291 A1* | 2/2012 | Kwon | H04L 1/0026 370/329 |
| 2012/0039342 A1 | 2/2012 | Berggren et al. | |
| 2012/0093090 A1* | 4/2012 | Han | H04L 27/2615 370/328 |
| 2012/0106478 A1* | 5/2012 | Han | H04L 5/0053 370/329 |
| 2013/0242729 A1* | 9/2013 | Chen | H04W 28/0289 370/230 |
| 2013/0308550 A1* | 11/2013 | Yin | H04L 5/001 370/329 |

OTHER PUBLICATIONS

PCT International Application No. PCT/KR2013/007217, Written Opinion of the International Searching Authority dated Nov. 27, 2013, 1 page.

* cited by examiner

METHOD AND APPARATUS FOR TRANSMITTING ACKNOWLEDGEMENT

CROSS-REFERENCE TO RELATED APPLICATIONS

This application is the National Stage filing under 35 U.S.C. 371 of International Application No. PCT/KR2013/007217, filed on Aug. 9, 2013, which claims the benefit of U.S. Provisional Application Ser. No. 61/681,612, filed on Aug. 9, 2012, the contents of which are all hereby incorporated by reference herein in their entirety.

BACKGROUND OF THE INVENTION

Field of the Invention

The present invention relates to wireless communications, and more particularly, to a method of transmitting positive-acknowledgement (ACK)/negative-acknowledgment (NACK) for hybrid automatic repeat request (HARQ) in a wireless communication system, and an apparatus using the method.

Related Art

Long term evolution (LTE) based on $3^{rd}$ generation partnership project (3GPP) technical specification (TS) release 8 is a widely used mobile communication standard. Recently, LTE-advanced (LTE-A) based on 3GPP TS release 10 supporting multiple carriers is under standardization.

As disclosed in 3GPP TS 36.211 V10.2.0 (2011-06) "Evolved Universal Terrestrial Radio Access (E-UTRA); Physical Channels and Modulation (Release 10)", a physical channel of 3GPP LTE/LTE-A can be classified into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Recently, an enhanced PDCCH (EPDCCH) for more flexible scheduling of a control channel has been introduced. The EPDCCH supports various schemes such as a search space in a PDSCH region, multiple antenna transmission, etc.

A cell coverage is increased, and a positive-acknowledgement (ACK)/negative-acknowledgment (NACK) repetition is introduced for a user equipment (UE) which does not have a good channel state in a cell boundary. Conventionally, downlink data and hybrid automatic repeat request (HARQ) ACK/NACK are 1:1 mapped. Upon reception of the downlink data, the UE transmits the HARQ ACK/NACK one time. However, a base station (BS) may not be able to correctly receive the HARQ ACK/NACK transmitted by the UE which does not have the good channel state. This may cause an error in which even if the UE successfully receives downlink data and thus transmits ACK, the BS fails to receive ACK, and thus determines that the UE fails to receive the downlink data. The ACK/NACK repetition is for decreasing a reception error of the BS by allowing the UE to repetitively transmit the HARQ ACK/NACK.

With an introduction of an EPDCCH and downlink data having a greater transport block size (TBS), there is a need to modify an HARQ operation.

SUMMARY OF THE INVENTION

The present invention provides a method of transmitting positive-acknowledgement (ACK)/negative-acknowledgement (NACK) for hybrid automatic repeat request (HARQ) in a wireless communication system, and a wireless device using the method.

In an aspect, a method of transmitting hybrid automatic repeat request (HARQ) positive acknowledgement (ACK)/negative acknowledgement (NACK) in a wireless communication system is provided. The method includes receiving, by a wireless device, information regarding a repetition count m (where m is an integer greater than 1) of the HARQ ACK/NACK from a base station, receiving, by the wireless device, a downlink transport block from the base station, transmitting, by the wireless device, a designated signal p times (where p is an integer greater than 0) to the base station, and repeatedly transmitting, by the wireless device, an ACK/NACK for the downlink transport block (m−p) times to the base station.

If decoding of the downlink transport block is not completed within a designated time, the designated signal can be transmitted.

In another aspect, a device for transmitting hybrid automatic repeat request (HARQ) positive acknowledgement (ACK)/negative acknowledgement (NACK) in a wireless communication system is provided. The device includes a radio frequency (RF) unit configured to transmit and receive a radio signal, and a processor operatively coupled to the RF unit and configured to receive information regarding a repetition count m (where m is an integer greater than 1) of the HARQ ACK/NACK from a base station, receive a downlink transport block from the base station, transmit a designated signal p times (where p is an integer greater than 0) to the base station, and repeatedly transmit an ACK/NACK for the downlink transport block (m−p) times to the base station.

Even if decoding of a downlink transport block cannot be complete within a given time, a hybrid automatic repeat request (HARQ) operation may be continued without stopping.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
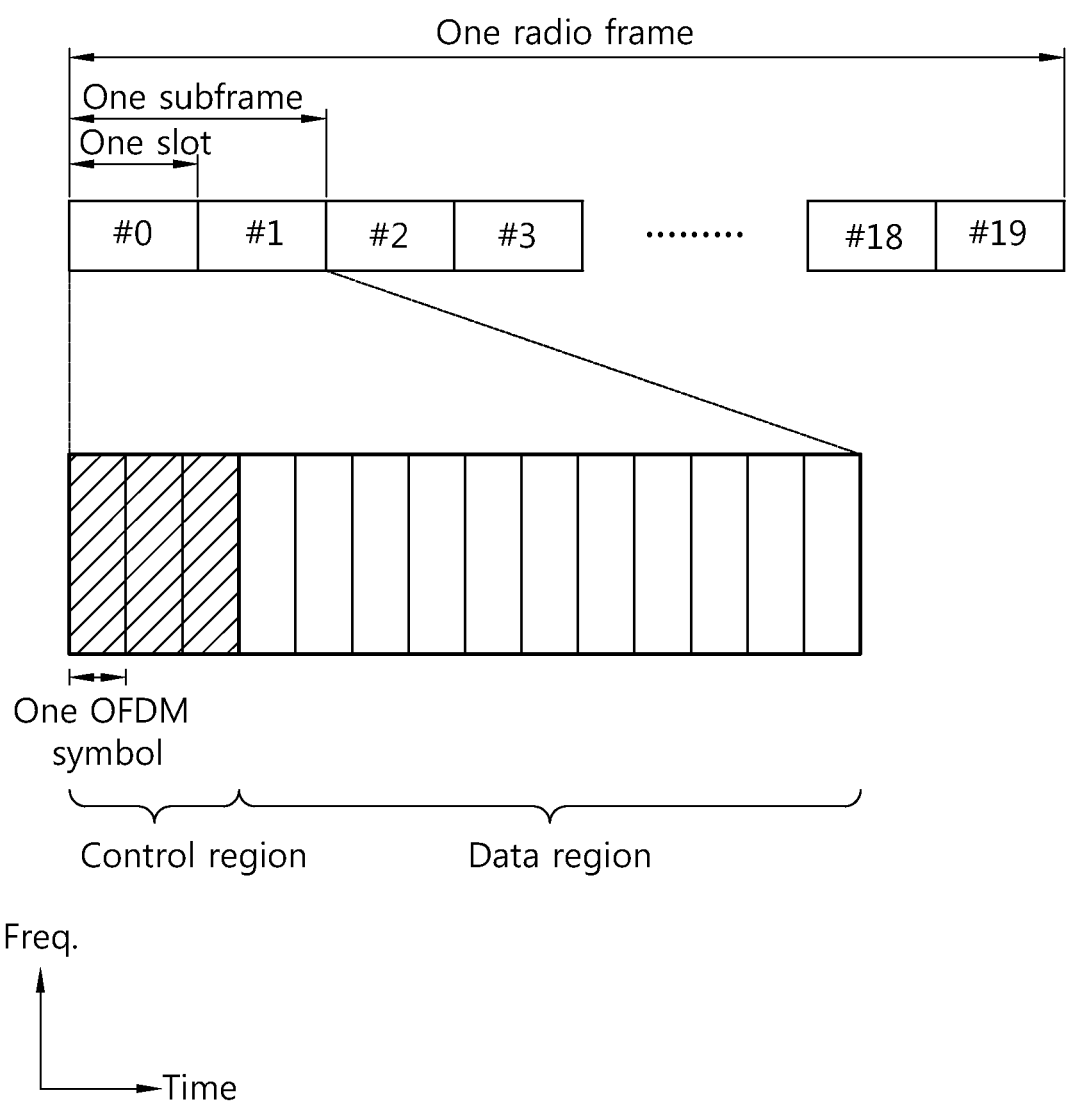
FIG. 1 shows a structure of a downlink (DL) radio frame in $3^{rd}$ generation partnership project (3GPP) long term evolution (LTE).

FIG. 1 shows a structure of a DL radio frame in 3GPP LTE-A. The section 6 of 3GPP TS 36.211 V10.2.0 (2011-06) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Figure 2:
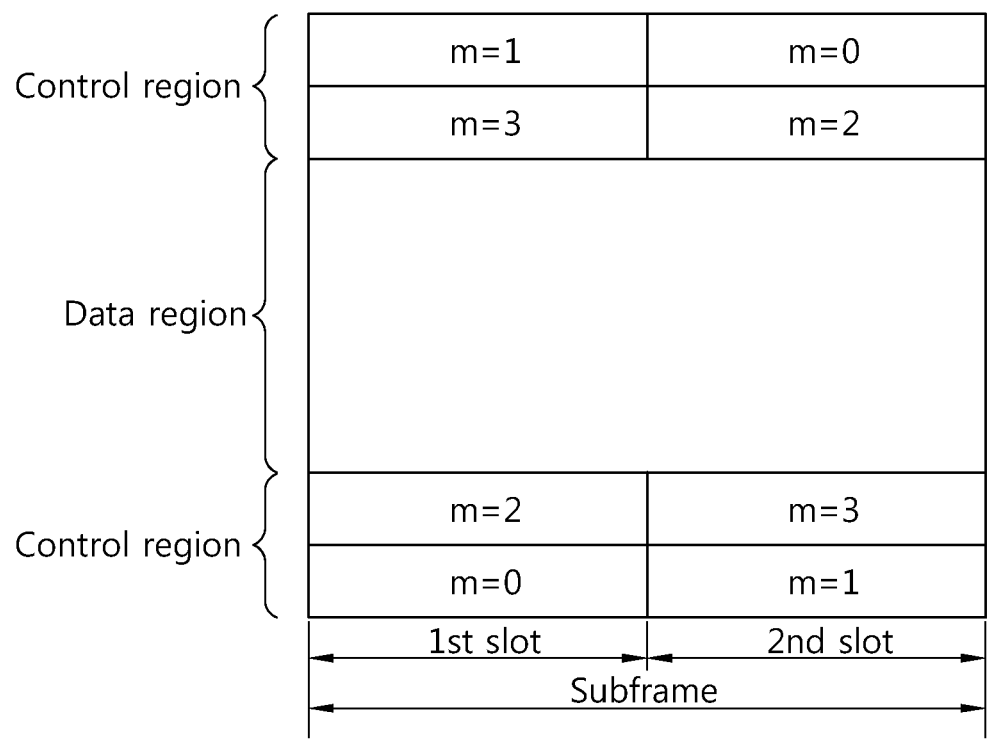
FIG. 2 shows a structure of an uplink (UL) subframe in 3GPP LTE.

FIG. 2 shows a structure of a UL subframe in 3 GPP LTE.

A UL subframe can be divided into a control region and a data region in frequency domain. The control region is a region to which a physical uplink control channel (PUCCH) is allocated. The data region is a region to which a physical uplink shared channel (PUSCH) is allocated.

The PUCCH is allocated in an RB pair in a subframe. RBs belonging to the RB pair occupy different subcarriers in each of a 1st slot and a 2nd slot. m is a location index indicating a logical frequency-domain location of the RB pair allocated to the PUCCH in the subframe.

It shows that RBs having the same value m occupy different subcarriers in the two slots.

The PUSCH is allocated by a UL grant on a PDCCH. Although not shown, a 4th OFDM symbol of each slot of a normal CP is used in transmission of a demodulation reference signal (DM RS).

Uplink control information (UCI) includes at least any one of HARQ ACK/NACK, channel state information (CSI), and scheduling request (SR). Hereinafter, as an index of indicating a state of a DL channel, the CSI may include at least any one of a channel quality indicator (CQI) and a precoding matrix indicator (PMI).

PUCCH formats are defined as a combination of UCI and PUCCH in order to transmit various UCI on PUCCH.

TABLE 1

| PUCCH format | Transmitted UCI |
| --- | --- |
| PUCCH format 1 | Positive SR |
| PUCCH format 1a/1b | 1 bit or 2 bits HARQ ACCK/NACK |
| PUCCH format 2 | CSI report |
| PUCCH format 2a/2b | CSI report and 1 bit or 2 bits HARQ ACCK/NACK |
| PUCCH format 3 | HARQ ACCK/NACK, SR, CSI |

A PUCCH format 1a/1b is used to carry 1 bit or 2 bits HARQ ACK/NACK by using binary phase shift keying (BPSK) modulation or quadrature phase shift keying (QPSK) modulation.

A PUCCH format 3 can be used to transmit 48 bits encoded UCI. The PUCCH format 3 can carry HARQ ACK/NACK for a plurality of serving cells and a CSI report for a single serving cell.

Now, a DL HARQ operation and a PUCCH structure will be described.

Figure 3:
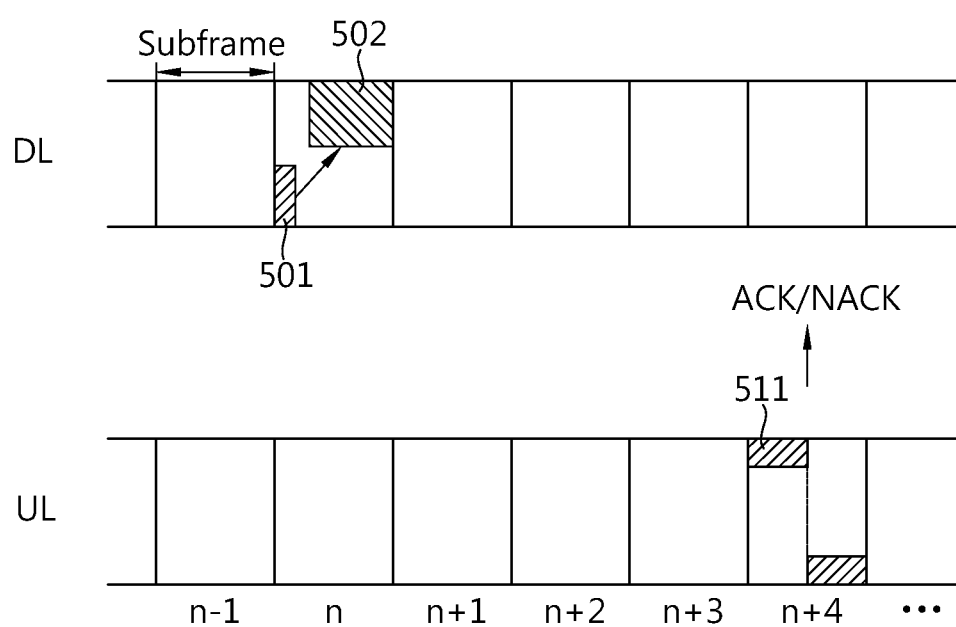
FIG. 3 shows a DL HARQ operation in 3GPP LTE.

FIG. 3 shows a DL HARQ operation in 3GPP LTE.

A wireless device monitors a PDCCH, and receives a DL grant including a DL resource allocation on a PDCCH 501 (or EPDDCH) in an $n^{th}$ DL subframe. The wireless device receives a DL transport block through a PDSCH 502 indicated by the DL resource allocation.

The wireless device transmits an ACK/NACK signal for the DL transport block on a PUCCH 511 in an $(n+4)^{th}$ UL subframe. The ACK/NACK signal corresponds to an ACK signal when the DL transport block is successfully decoded, and corresponds to a NACK signal when the DL transport block fails in decoding. Upon receiving the NACK signal, a BS may retransmit the DL transport block until the ACK signal is received or until the number of retransmission attempts reaches its maximum number.

In 3GPP LTE, PUCCH formats 1a/1b/3 are used to carry an ACK/NACK signal which is a reception acknowledgement for HARQ.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by the following equation.

$$r_u(n) = e^{jb(n)\pi/4} \quad \text{[Equation 1]}$$

Herein, u denotes a root index, and n denotes a component index in the range of $0 \le n \le N-1$, where N is a length of the base sequence. b(n) is defined in the section 5.5 of 3GPP TS 36.211 V10.2.0.

A length of a sequence is equal to the number of elements included in the sequence. u can be determined by a cell identifier (ID), a slot number in a radio frame, etc. When it is assumed that the base sequence is mapped to one resource block in a frequency domain, the length N of the base sequence is 12 since one resource block includes 12 subcarriers. A different base sequence is defined according to a different root index.

The base sequence r(n) can be cyclically shifted by the following equation to generate a cyclically shifted sequence $r(n, I_{cs})$.

$$r(n, I_{cs}) = r(n) \cdot \exp\left(\frac{j2\pi I_{cs} n}{N}\right), \quad \text{[Equation 2]}$$

$$0 \le I_{cs} \le N-1$$

Herein, $I_{cs}$ denotes a CS index indicating a CS amount ($0 \le I_{cs} \le N-1$).

Hereinafter, the available CS of the base sequence denotes a CS index that can be derived from the base sequence according to a CS interval. For example, if the base sequence has a length of 12 and the CS interval is 1, the total number of available CS indices of the base sequence is 12. Alternatively, if the base sequence has a length of 12 and the CS interval is 2, the total number of available CS indices of the base sequence is 6.

Figure 4:
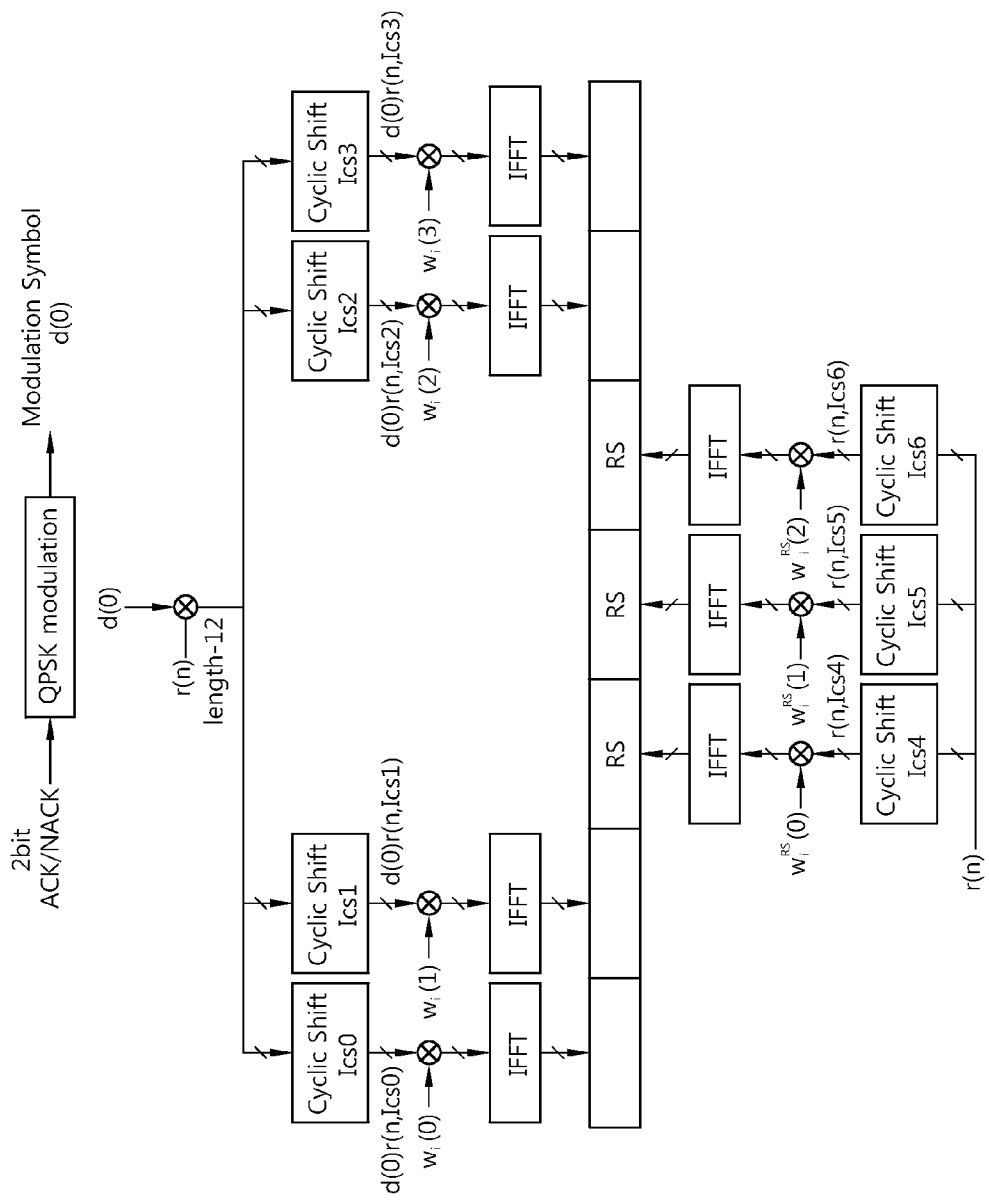
FIG. 4 shows transmission of an ACK/NACK signal when a PUCCH format 1b is used in a normal CP case in 3GPP LTE.

FIG. 4 shows transmission of an ACK/NACK signal when a PUCCH format 1b is used in a normal CP case in 3GPP LTE.

One slot includes 7 OFDM symbols. Three OFDM symbols are reference signal (RS) OFDM symbols for an RS. Four OFDM symbols are data OFDM symbols for an ACK/NACK signal.

In the PUCCH format 1b, a modulation symbol d(0) is generated by modulating a 2-bit ACK/NACK signal based on quadrature phase shift keying (QPSK).

A CS index $I_{cs}$ may vary depending on a slot number $n_s$ in a radio frame and/or a symbol index l in a slot.

In the normal CP case, there are four data OFDM symbols for transmission of the ACK/NACK signal in one slot. Therefore, assume that CS indices corresponding to the respective data OFDM symbols are denoted by $I_{cs0}$, $I_{cs1}$, $I_{cs2}$, and $I_{cs3}$.

The modulation symbol d(0) is spread to a cyclically shifted sequence $r(n, I_{cs})$. When a one-dimensional spreading sequence corresponding to an $(i+1)^{th}$ OFDM symbol in a slot is denoted by m(i), it can be expressed as follows.

$\{m(0), m(1), m(2), m(3)\} = \{d(0)r(n, I_{cs0}), d(0)r(n, I_{cs1}), d(0)r(n, I_{cs2}), d(0)r(n, I_{cs3})\}$

In order to increase UE capacity, the one-dimensional spreading sequence can be spread by using an orthogonal sequence. An orthogonal sequence $w_i(k)$ (where i is a sequence index, $0 \le k \le K-1$) based on a spread factor K is as follows.

TABLE 2

| Index (i) | K = 4<br>$[w_i(0), w_i(1), w_i(2), w_i(3)]$ | K = 3<br>$[w_i(0), w_i(1), w_i(2)]$ |
|---|---|---|
| 0 | [+1, +1, +1, +1] | [+1, +1, +1] |
| 1 | [+1, −1, +1, −1] | [+1, $e^{j2\pi/3}$, $e^{j4\pi/3}$] |
| 2 | [+1, −1, −1, +1] | [+1, $e^{j4\pi/3}$, $e^{j2\pi/3}$] |

A different spread factor can be used for each slot.

Therefore, when any orthogonal sequence index i is given, two-dimensional spreading sequences {s(0), s(1), s(2), s(3)} can be expressed as follows.

$\{s(0), s(1), s(2), s(3)\} = \{w_i(0)m(0), w_i(1)m(1), w_i(2)m(2), w_i(3)m(3)\}$

The two-dimensional spreading sequences {s(0), s(1), s(2), s(3)} are subjected to inverse fast Fourier transform (IFFT) and thereafter are transmitted in corresponding OFDM symbols. Accordingly, the ACK/NACK signal is transmitted on a PUCCH.

An RS of the PUCCH format 1b is also transmitted by cyclically shifting the base sequence r(n) and then by spreading it by the use of an orthogonal sequence. When CS indices corresponding to three RS OFDM symbols are denoted by $I_{cs4}$, $I_{cs5}$, and $I_{cs6}$, three cyclically shifted sequences $r(n, I_{cs4})$, $r(n, I_{cs5})$, and $r(n, I_{cs6})$ can be obtained. The three cyclically shifted sequences are spread by the use of an orthogonal sequence $w^{RS}_i(k)$ having a spreading factor K=3.

An orthogonal sequence index i, a CS index $I_{cs}$, and a resource block index m are parameters required to construct the PUCCH, and are also resources used to identify the PUCCH (or UE). If the number of available cyclic shifts is 12 and the number of available orthogonal sequence indices is 3, PUCCHs for 36 UEs in total can be multiplexed to one resource block.

In the 3GPP LTE, a resource index $n^{(1)}_{PUCCH}$ is defined in order for the UE to obtain the three parameters for constructing the PUCCH. The resource index $n^{(1)}_{PUCCH}$ is defined to $n_{CCE} + N^{(1)}_{PUCCH}$, where $n_{CCE}$ is a number indicating a first CCE used for transmission of a corresponding DCI (i.e., a DL resource allocation used to receive DL data corresponding to an ACK/NACK signal), and $n^{(1)}_{PUCCH}$ is a parameter reported by a BS to the UE by using a higher-layer message.

To configure a resource index for the PUCCH, the UE uses a resource allocation of a PDCCH. That is, a lowest CCE index (or an index of a first CCE) used for transmission of the PDCCH is $n_{CCE}$, and the resource index is determined as $n^{(1)}_{PUCCH} = n_{CCE} + N^{(1)}_{PUCCH}$.

Time, frequency, and code resources used for transmission of the ACK/NACK signal are referred to as ACK/NACK resources or PUCCH resources. As described above, an index of the ACK/NACK resource required to transmit the ACK/NACK signal on the PUCCH (also referred to as an ACK/NACK resource index or a PUCCH index) can be expressed with at least any one of an orthogonal sequence index i, a CS index $I_{cs}$, a resource block index m, and a PUCCH index $n^{(1)}_{PUCCH}$ for obtaining the three indices. The ACK/NACK resource may include at least any one of an orthogonal sequence, a cyclic shift, a resource block, and a combination thereof.

Figure 5:
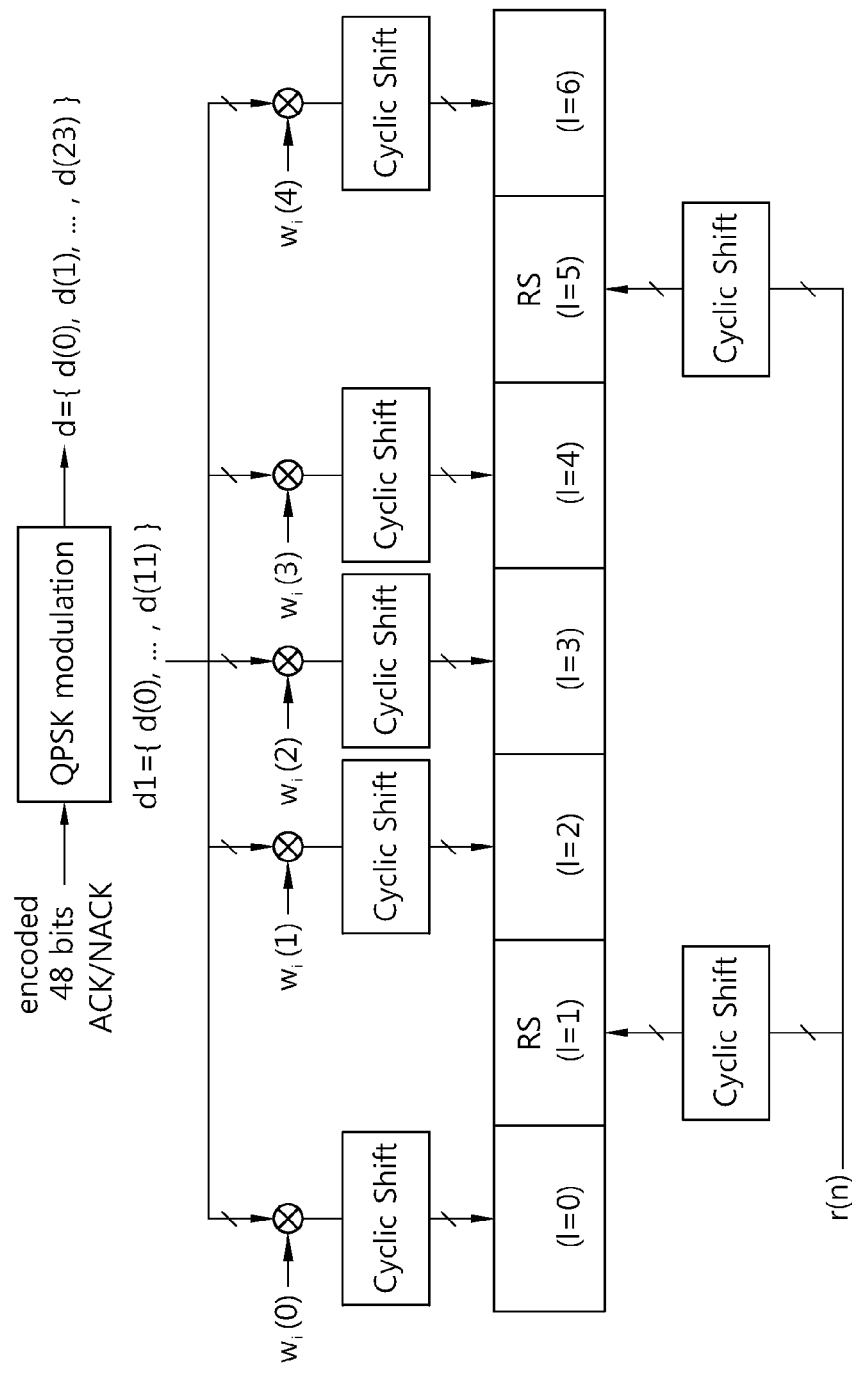
FIG. 5 shows a structure of a PUCCH format 3 in a normal CP case.

FIG. 5 shows a structure of a PUCCH format 3 in a normal CP case.

One slot includes 7 OFDM symbols. l denotes an OFDM symbol number in the slot, and has a value in the range of 0 to 6. Two OFDM symbols with l=1, 5 are used as RS OFDM symbols for a reference signal, and the remaining OFDM symbols are used as data OFDM symbols for a UCI signal.

A symbol sequence d={d(0), d(1), . . . , d(23)} is generated by performing quadrature phase-shift keying (QPSK) modulation on 48-bit encoded UCI (e.g., encoded ACK/NACK). d(n)(n=0, 1, . . . , 23) is a complex-valued modulation symbol. The symbol sequence d can be regarded as a set of modulation symbols. The number of bits of the UCI or a modulation scheme is for exemplary purposes only, and thus the present invention is not limited thereto.

One PUCCH uses one resource block (RB), and one subframe includes a first slot and a second slot. A symbol sequence d={d(0), d(1), . . . , d(23)} is divided into two sequences d1={d(0), . . . , d(11)} and d2={d(12), . . . , d(23)}, each having a length of 12. The first sequence d1 is transmitted in the first slot, and the second sequence d2 is transmitted in the second slot. In FIG. 3, the first sequence d1 is transmitted in the first slot.

The symbol sequence is spread with an orthogonal sequence $w_i$. Symbol sequences correspond to respective data OFDM symbols. An orthogonal sequence is used to identify a PUCCH (or wireless device) by spreading the symbol sequence across the data OFDM symbols.

In two RS OFDM symbols, an RS sequence used in UCI demodulation is mapped and transmitted.

In the PUCCH format 3, only the orthogonal sequence is used to distinguish wireless devices. To allocate the orthogonal sequence for the PUCCH format 3, a resource index may be defined similarly to the PUCCH format 1. A BS allocates a resource index set for the PUCCH format 3 in advance to the wireless device through an RRC message. In addition, a resource index to be used in the resource index set is directly indicated by the DL grant.

Hereinafter, ACK/NACK is simply referred to as A/N.

Figure 6:
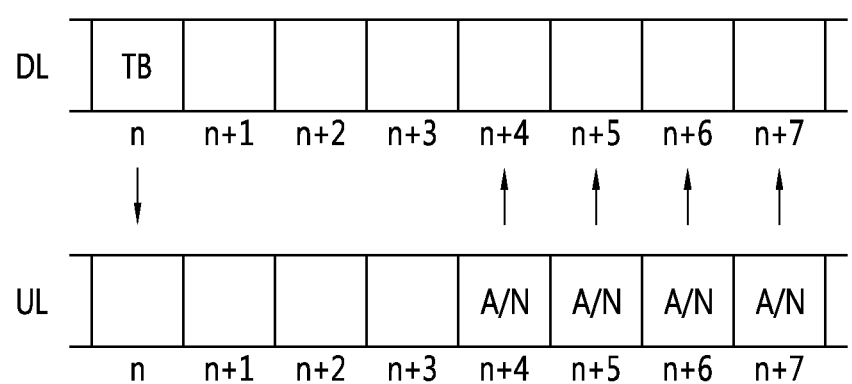
FIG. 6 shows an example of an ACK/NACK repetition.

FIG. 6 shows an example of an ACK/NACK repetition.

If a transport block (TB) is received in a DL subframe n, a wireless device transmits A/N repetitively m times starting from a UL subframe n+k. That is, the A/N is repetitively transmitted in each of UL subframes n+k, n+k+1, n+k+(m−1).

k relates to UL timing for preparing a time required when the wireless device transmits A/N after completing TB decoding. In 3GPP LTE FDD, k=4. An example of k=4 and m=4 is shown in FIG. 6. The value m is for example purposes only.

If the A/N repetition is not configured, a PUCCH resource for A/N is determined dynamically on the basis of a lowest CCE index of a corresponding PDCCH. However, if the A/N repetition is configured, the PUCCH resource for the A/N is given in advance by a BS in each UL subframe. That is, the BS predetermines a repetition count m and the PUCCH resource, and reports information thereof to the wireless device.

Although k=4 is described for example hereinafter, the present invention is not limited thereto. In addition, although it is assumed that A/N is repetitively transmitted in consecutive UL subframes n+k, n+k+1, . . . , n+k+(m−1), the UL subframes may not be consecutive.

The repeated A/N may be transmitted on a PUCCH (e.g., a PUCCH format 1a/1b/3) or may be transmitted on a PUSCH.

As described above, UL timing k for HARQ is fixed or pre-defined. This is defined by considering a TB decoding time.

In the existing 3GPP LTE, since a PDCCH is transmitted in first three OFDM symbols, the PDCCH is received and then a PDSCH is received sequentially. However, an EPDCCH transmitted in a PDSCH region has been introduced. The EPDCCH may be transmitted across all subframes. k=4 may be insufficient to detect the EPDCCH and to complete decoding of the PDSCH. That is, the wireless device cannot complete TB decoding within a given time.

A timing advance (TA) may be increased due to a greater coverage, a frequency separation between cells, etc. When the TA is increased, it means that a start time of a UL subframe is advanced in comparison with a start time of a DL subframe n, and the wireless device may not be able to complete TB decoding within a given time.

If a capability of the wireless device is insufficient or if a TB having a significantly transport block (TBS) is received, the wireless device may not be able to complete the decoding within the given time.

According to the proposed embodiment, when the wireless device cannot complete the TB decoding within the given time (e.g., k=4), the decoding is not discarded. The wireless device may store the received TB in a buffer, and thereafter may complete the TB decoding when there is an enough processing capacity. Further, a modified A/N based thereon is transmitted.

Figure 7:
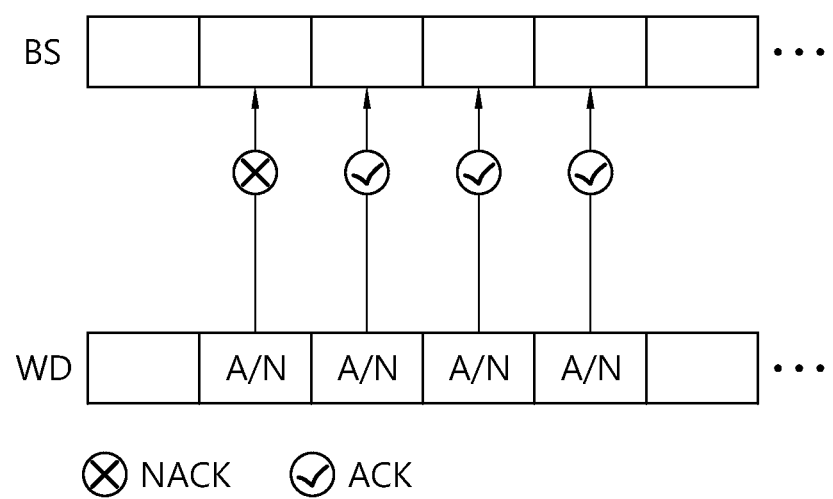
FIG. 7 shows an ACK/NACK (A/N) repetition according to an embodiment of the present invention.

FIG. 7 shows an A/N repetition according to an embodiment of the present invention.

If it is determined that TB decoding cannot be complete within a given time, for first repeated A/N, a wireless device transmits a designated signal (or a decoding continuation signal) indicating decoding cannot be complete irrespective of whether the decoding is successful. Starting from second repeated AN, normal A/N (e.g., ACK or NACK or discontinuous transmission (DTX)) is transmitted after the TB decoding is complete.

Although it is assumed hereinafter that a designated signal is NACK and normal A/N is ACK, this is for exemplary purposes only. The designated signal may be ACK or NACK or may be a signal generated irrespective of A/N.

Although it is exemplified herein that a designated signal is transmitted one time and repeated A/N is transmitted three times when a 4-time A/N repetition (m=4) is configured, an A/N repetition count m or a repetition count p of the designated signal is not limited thereto.

A BS may ignore the designated signal, and may determine whether the TB decoding is successful on the basis of normal A/N received subsequently.

Figure 8:
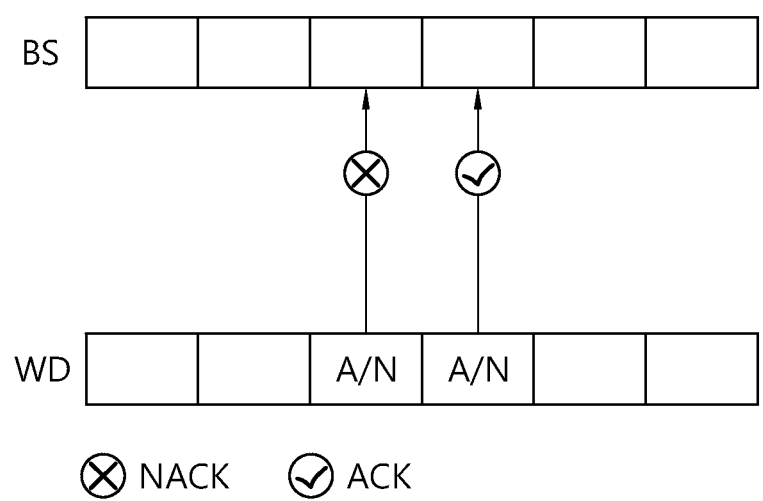
FIG. 8 shows another example of an A/N repetition.

FIG. 8 shows another example of an A/N repetition. In this example, when a 2-time A/N repetition (m=2) is configured, a designated signal is transmitted one time (p=1), and A/N is transmitted one time.

Figure 9:
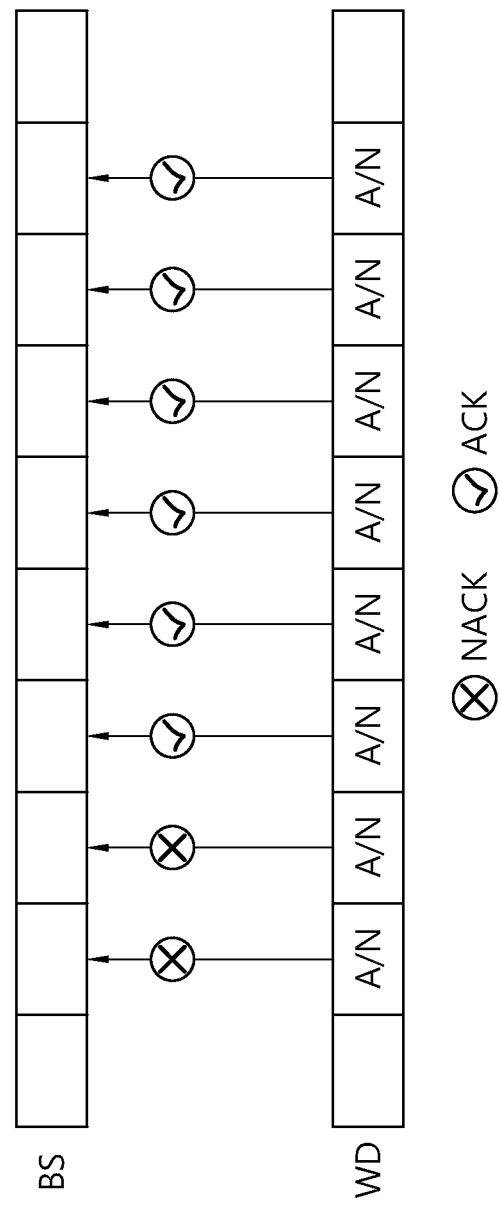
FIG. 9 shows another example of an A/N repetition.

FIG. 9 shows another example of an A/N repetition. In this example, when an 8-time A/N repetition (i.e., m=8) is configured, a designated signal is transmitted two times (p=2), and A/N is transmitted 6 times.

A repetition count of the designated signal may be pre-defined. The repetition count may be designated to a value equal to or greater than 1.

The designated signal may be transmitted instead of A/N until a wireless device completes decoding of a received TB. In this case, a maximum repetition count may be defined.

For example, assume that the maximum repetition count is 3. If it fails to complete the TB decoding even in a UL subframe n+4 after a TB is received in a DL subframe n, the wireless device transmits the designated signal. Further, if it fails to complete the TB decoding even in a UL subframe n+4+1 and a UL subframe n+4+2, the wireless device transmits the designated signal in each of the UL subframe n+4+1 and the UL subframe n+4+2. Thereafter, even if the TB decoding is complete, the wireless device may transmit A/N or may discard A/N transmission. This is because a BS may not receive A/N correctly due to a poor channel state even if A/N is transmitted one time after the designated signal is transmitted three times in a situation where a 4-time A/N repetition is configured.

The repetition count of the designated signal (or the maximum repetition count) may be reported by the BS to the wireless device by considering a channel state, a capability of the wireless device, a TA, a cell size, etc.

Figure 10:
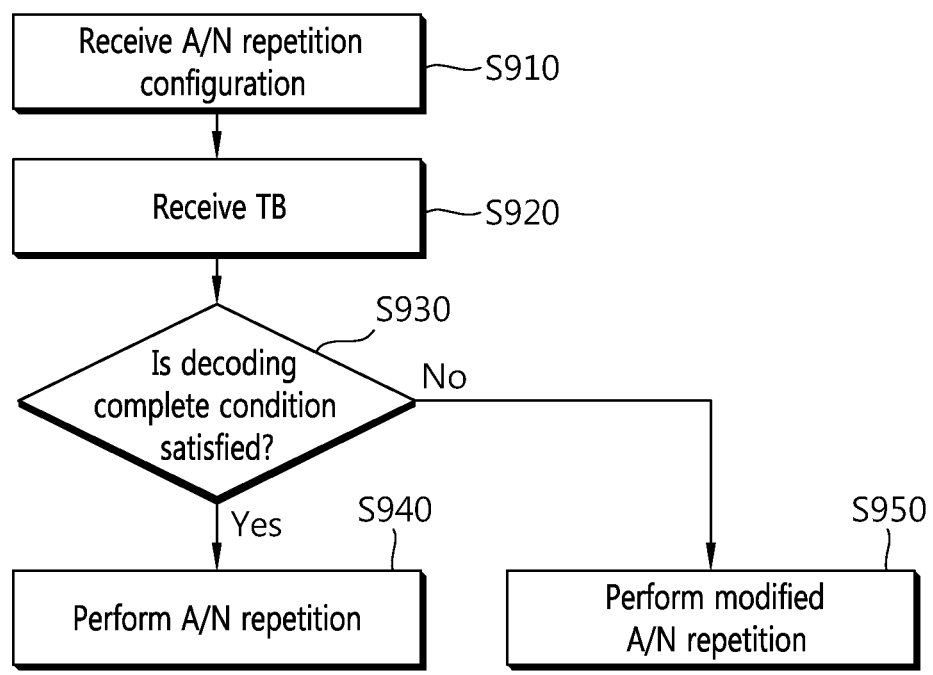
FIG. 10 is a flowchart showing an A/N transmission method according to an embodiment of the present invention.

FIG. 10 is a flowchart showing an A/N transmission method according to an embodiment of the present invention.

In step S910, a wireless device receives an A/N repetition configuration from a BS. The A/N repetition configuration may include information regarding an A/N repetition count and/or a PUCCH resource for A/N transmission. The A/N repetition configuration may be given by each of a plurality of serving cells.

The A/N repetition configuration may include information regarding a repetition count (or a maximum repetition count) of a designated signal. The A/N repetition configuration may include information regarding whether the designated signal is transmitted and/or regarding a decoding complete configuration described below.

In step S920, the wireless device receives one or more TBs through a PDSCH. The PDSCH may be indicated by a PDCCH or an EPDCCH.

In step S930, the wireless device determines whether the decoding complete condition is satisfied. When the TB is received in a subframe n and A/N must be transmitted first in a subframe n+k, whether TB decoding can be complete in the subframe n+k is determined. If the decoding can be complete, it is considered that the decoding complete condition is satisfied.

The decoding complete condition may be defined based on a TB size, a TA size, and a capability of the wireless device. For example, if a size of the received TB is greater than a specific value, it may be determined that decoding cannot be complete. If a size of a TA of a corresponding cell is greater than a specific value, it may be determined that decoding cannot be complete. Alternatively, whether decoding is complete can be determined by considering both the TB size and the TA size.

In step S940, if the decoding complete condition is satisfied, A/N is transmitted repetitively according to a repetition count. The repeated A/N may be transmitted on a PUCCH or a PUSCH on the basis of a determined PUCCH resource.

In step S950, if the decoding complete condition is not satisfied, a modified A/N repetition is performed. That is, a designated signal is transmitted in a subframe n+k, and A/N for the TB is transmitted starting from a subframe n+k+1 after decoding is complete. The designated signal and the repeated A/N may be transmitted on the PUCCH on the basis of the determined PUCCH resource or may be transmitted on the PUSCH.

Now, an additional A/N transmission method based on the embodiment of FIG. 10 is described.

Figure 11:
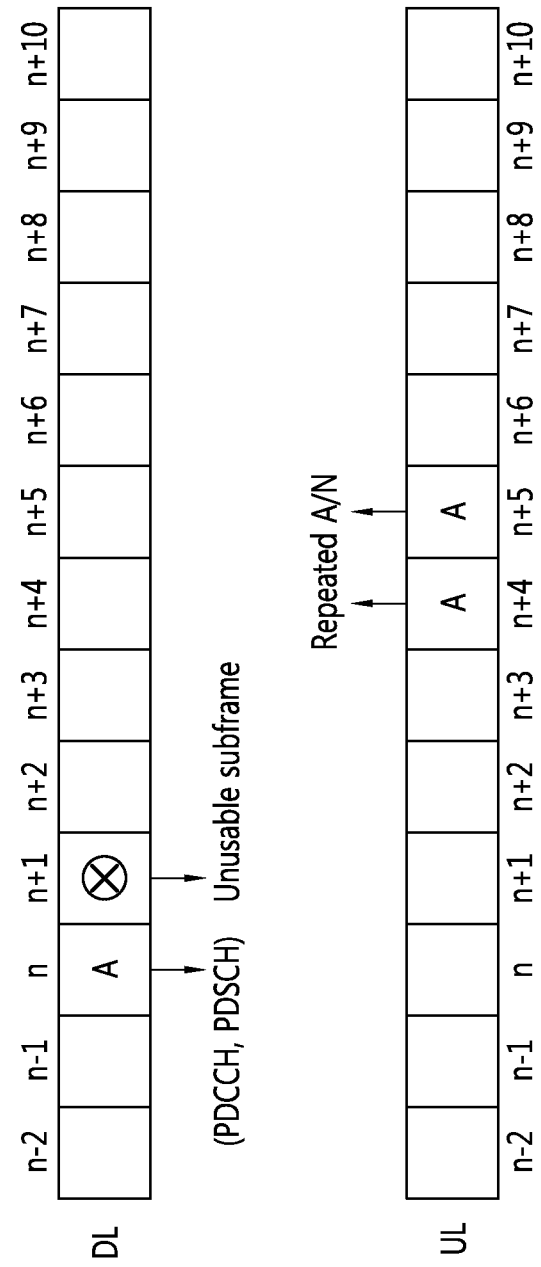
FIG. 11 shows an example of an A/N repetition.

FIG. 11 shows an example of an A/N repetition. Assume that m=2 and k=4.

If a TB A is received in a DL subframe n, a UL subframe corresponding thereto is transmitted in each of UL subframes n+4 and n+5. If decoding of the TB A is complete, A/N for the TB A may be transmitted in the UL subframe n+4. If the decoding of the TB A is not complete, a designated signal may be transmitted in the subframe n+4.

An A/N repetition is configured so that a wireless device having limited transmit power reliably transmits A/N to a BS. For this, when an m-time A/N repetition mode is configured, DL/UL scheduling may be prohibited between DL subframes n+1, . . . , n+(m−1). Accordingly, there is a problem in that the more times the A/N is repeated, the more the subframes cannot be used in scheduling.

If the A/N repetition is not necessarily performed due to a change in a channel state, the BS may release the A/N repetition configuration. However, if an A/N transmission mode is configured/released for all wireless devices in a cell according to a channel change, a load of a scheduler may be increased.

A method proposed in embodiments described below is for compulsively restricting a predetermined A/N repetition count or for de-activating a determined A/N repetition or for transmitting two A/Ns (or 2 UL channels) in one UL subframes.

Figure 12:
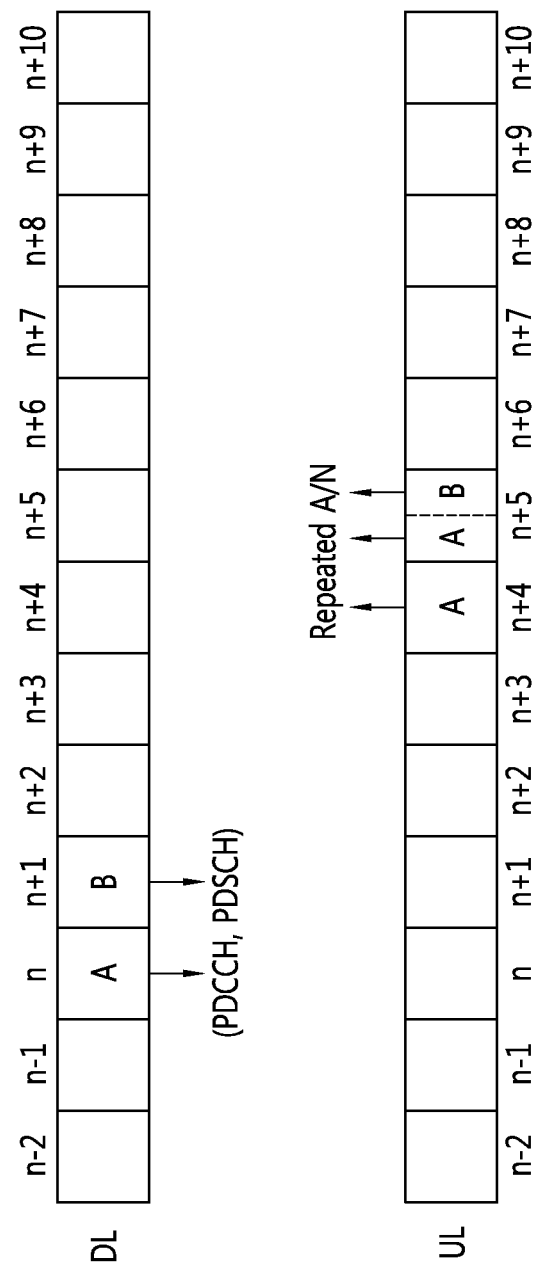
FIG. 12 shows an A/N transmission method according to an embodiment of the present invention.

FIG. 12 shows an A/N transmission method according to an embodiment of the present invention.

A repeated A/N is applied to a TB A. The repeated A/N is not applied to a TB B.

The TB A is received in a subframe n, and the repeated A/N for the TB A is transmitted in subframes n+4 and n+5. In this case, assume that the TB B is received in a subframe n+1. A/N for the TB B is transmitted in the subframe n+5.

Two A/Ns are transmitted in the subframe n+5, and this is called an overlapped subframe.

In each subframe, a PUCCH resource for A/N may be determined as follows.

In the subframe n+4, a PUCCH resource of A/N for the TB A is determined from a PDCCH (or EPDCCH) corresponding to the TB A. For example, the PUCCH resource may be determined on the basis of a lowest CCE index of a corresponding PDCCH.

In the subframe n+5, a PUCCH resource of A/N for the TB A uses a PUCCH resource predetermined for the A/N repetition.

In the subframe n+5, a PUCCH resource of A/N for the TB B is determined from a resource of a PDCCH (or EPDCCH) corresponding to the TB B. Therefore, a collision of the PUCCH resource between the TB A and the TB B can be avoided.

When scheduling is prohibited in a subframe n+1, it is called a first transmission mode. When scheduling is allowed in the subframe n+1, it is called a second transmission mode. More generally, when a TB to which repeated A/N is applied is transmitted in a subframe n, the first transmission mode prohibits scheduling in subframes n+1, . . . , n+m, and the second transmission mode allows scheduling in at least one of the subframes n+1, . . . , n+m.

When it is configured to the second transmission mode, as shown in FIG. 12, it may be necessary to transmit a plurality of A/Ns through a plurality of PUCCHs in a specific subframe. In this case, there is a need to consider the following aspects.

Limited UL transmit power

An advantage obtained from a single-carrier transmission scheme is decreased. For example, a cubic metric (CM) is increased.

First, when considering limited UL transmit power, it is difficult to transmit two UL channels if there is no headroom in transmit power of a wireless device. That is, two PUCCHs can be transmitted in one subframe only when the wireless device has a sufficient power headroom. Therefore, according to a power headroom size or a channel state, switching can be performed between the first transmission mode and the second transmission mode.

Since UL transmit power is determined for each UL channel, a transmit power sum of two PUCCHs may exceed maximum transmit power. In this case, transmit power may be distributed as follows.

First, the transmit power is distributed equally to the two PUCCHs.

Second, the transmit power is allocated preferentially to repeated A/N. For example, in a subframe n+5, transmit power of a PUCCH for A/N for a TB A is set to be higher than transmit power of a PUCCH for A/N for a TB B.

Third, the transmit power is allocated preferentially to first A/N which is not repeated. For example, in the subframe n+5, the transmit power of the PUCCH for the A/N for the TB A is set to be lower than the transmit power of the PUCCH for the A/N for the TB B.

Next, a single-carrier feature is considered. Since UL transmission of 3GPP LTE is based on SC-FDMA, a CM feature may deteriorate when transmission of two PUCCHs or PUCCH/PUSCH is allowed. If it is determined that a channel situation is significantly good and thus the deterioration of the CM feature can be compensated for, simultaneous transmission of multiple UL channels may be applied.

A BS may report to the wireless device whether to apply the first transmission mode or the second transmission mode.

If an A/N repetition count is m, scheduling may be allowed only in a subframe n+(m−1). For example, if m=2, scheduling is applied in a subframe n+1. If m=3, scheduling is allowed in a subframe n+2, and scheduling is not allowed in the subframe n+1. This is to allow A/N to overlap only in one subframe, so that an additional PUCCH resource can be prevented from being allocated.

If a PUSCH is scheduled in an overlapped subframe, at least one of a plurality of A/Ns may be transmitted through one PUSCH. All of the plurality of A/Ns may be transmitted on the PUSCH, or only one of the A/Ns may be transmitted on the PUCCH and the remaining A/Ns may be transmitted on the PUSCH.

In the embodiment of FIG. 12, the repeated A/N is not applied to the TB B transmitted in the subframe n+1. This means that, as to a TB scheduled in a specific subframe, it may be predetermined that the repeated A/N is not applied thereto. Alternatively, information indicating whether to apply the repeated A/N may be included in scheduling information of the TB.

Figure 13:
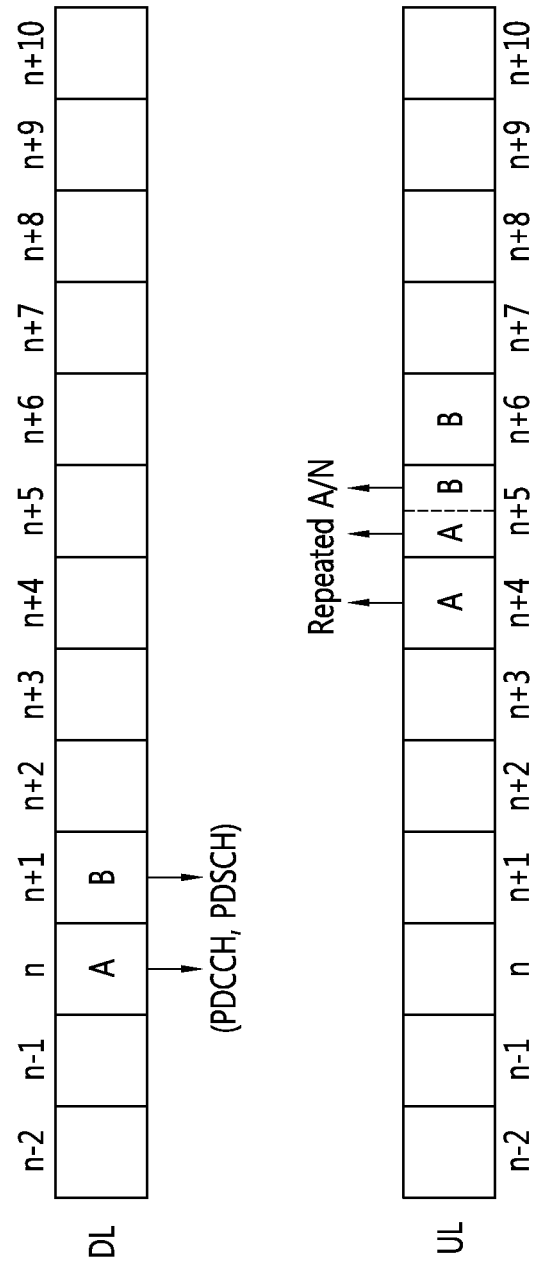
FIG. 13 shows an A/N transmission method according to another embodiment of the present invention.

FIG. 13 shows an A/N transmission method according to another embodiment of the present invention.

In comparison with the embodiment of FIG. 12, repeated A/N is also effectively applied to a TB B in this case.

In each subframe, a PUCCH resource for A/N may be determined as follows.

In the subframe n+4, a PUCCH resource of A/N for the TB A is determined from a PDCCH (or EPDCCH) corresponding to the TB A. For example, the PUCCH resource may be determined on the basis of a lowest CCE index of a corresponding PDCCH.

In the subframe n+5, a PUCCH resource of A/N for the TB A uses a PUCCH resource predetermined for the A/N repetition.

In the subframe n+5, a PUCCH resource of A/N for the TB B is determined from a resource of a PDCCH (or EPDCCH) corresponding to the TB B. Therefore, a collision of the PUCCH resource between the TB A and the TB B can be avoided.

In the subframe n+6, a PUCCH resource of A/N for the TB B uses a PUCCH resource predetermined for the A/N repetition.

Figure 14:
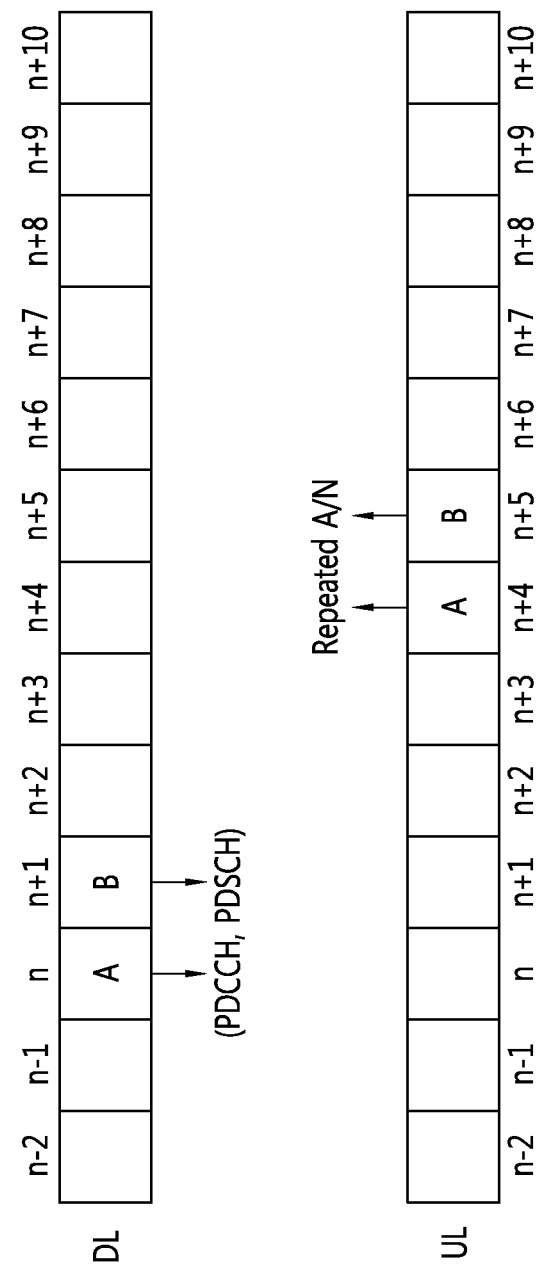
FIG. 14 shows an A/N transmission method according to another embodiment of the present invention.

FIG. 14 shows an A/N transmission method according to another embodiment of the present invention.

Even if the A/N repetition is configured, the A/N repetition stops when a plurality of A/Ns are transmitted in a specific UL subframe. In an overlapped subframe, A/N for a subsequence TB is transmitted, and transmission of the repeated A/N is discarded.

If the TB B is not scheduled in a subframe n+1, A/N for the TB A is transmitted in subframes n+4 and n+5. However, if the TB B is received in the subframe n+1, the transmission of the repeated A/N in the subframe n+5 stops, and A/N for the TB B is transmitted.

Figure 15:
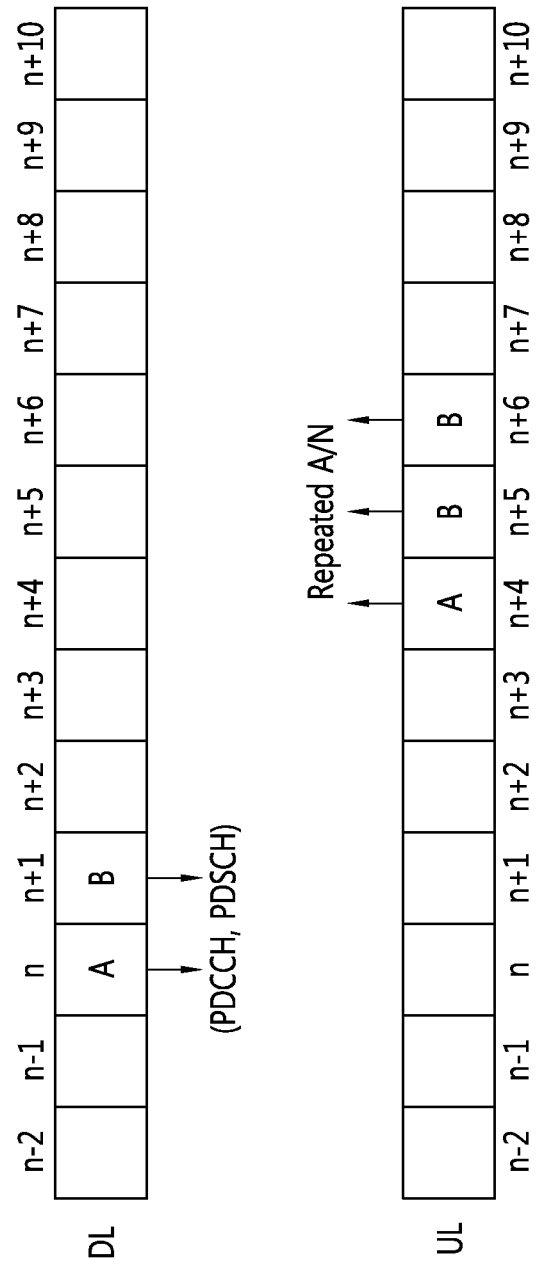
FIG. 15 shows an A/N transmission method according to another embodiment of the present invention.

FIG. 15 shows an A/N transmission method according to another embodiment of the present invention. In comparison with the embodiment of FIG. 14, an A/N repetition is configured to a TB B in this case.

Figure 16:
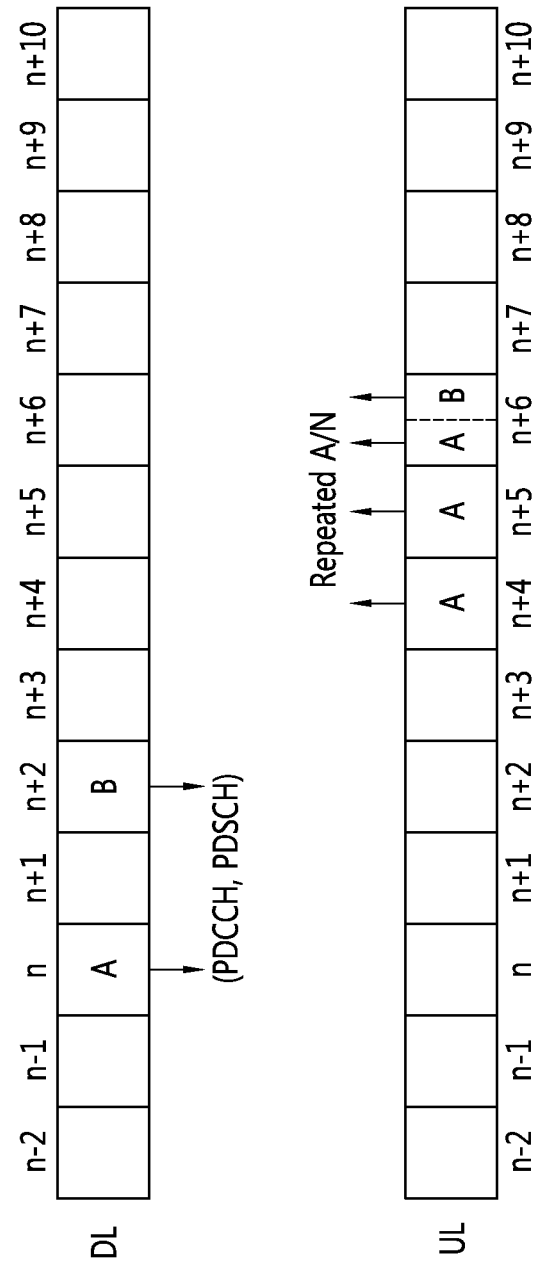
FIG. 16 shows an A/N transmission method according to another embodiment of the present invention.

FIG. 16 shows an A/N transmission method according to another embodiment of the present invention.

This is a case where a repetition count is m=3, scheduling is allowed in a subframe n+2, and scheduling is not allowed in a subframe n+1. Repeated A/N is not applied to a TB B which is scheduled in the subframe n+2. Even if a PDSCH is not scheduled in the subframe n+1, a wireless device may not transmit corresponding A/N.

A TB A is received in a subframe n, and repeated A/N for the TB A is transmitted in subframes n+4, n+5, and n+6. The TB B is received in the subframe n+2, and A/N for the TB B is transmitted in the subframe n+6.

Two A/Ns are triggered in the subframe n+6, and this is called an overlapped subframe.

Figure 17:
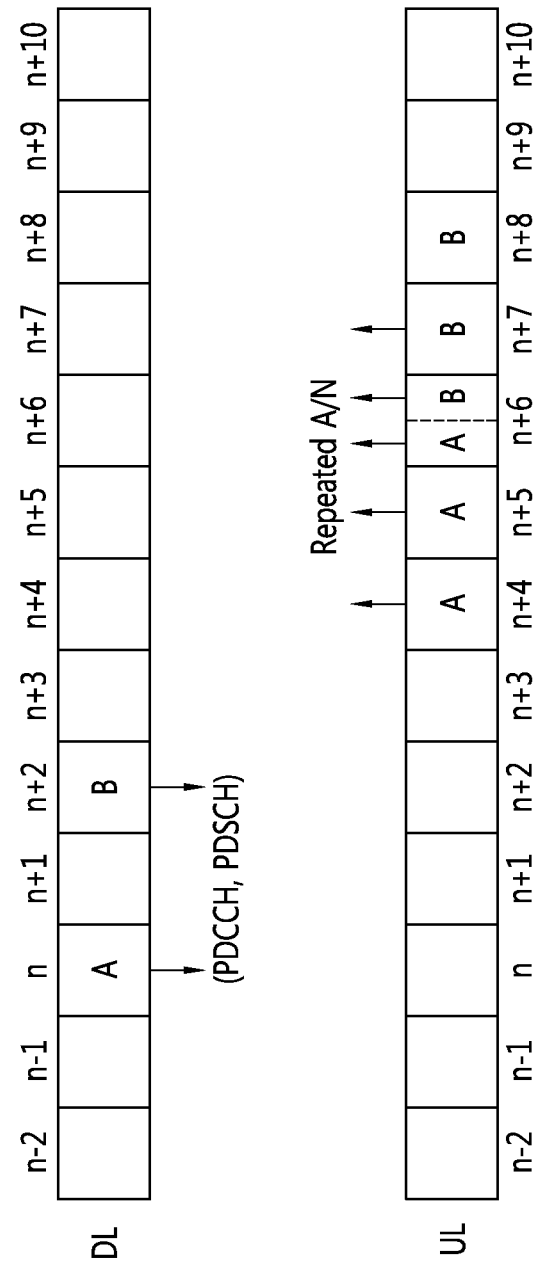
FIG. 17 shows an A/N transmission method according to another embodiment of the present invention.

FIG. 17 shows an A/N transmission method according to another embodiment of the present invention.

In comparison with the embodiment of FIG. 16, repeated A/N is also effectively applied to a TB B in this case.

Figure 18:
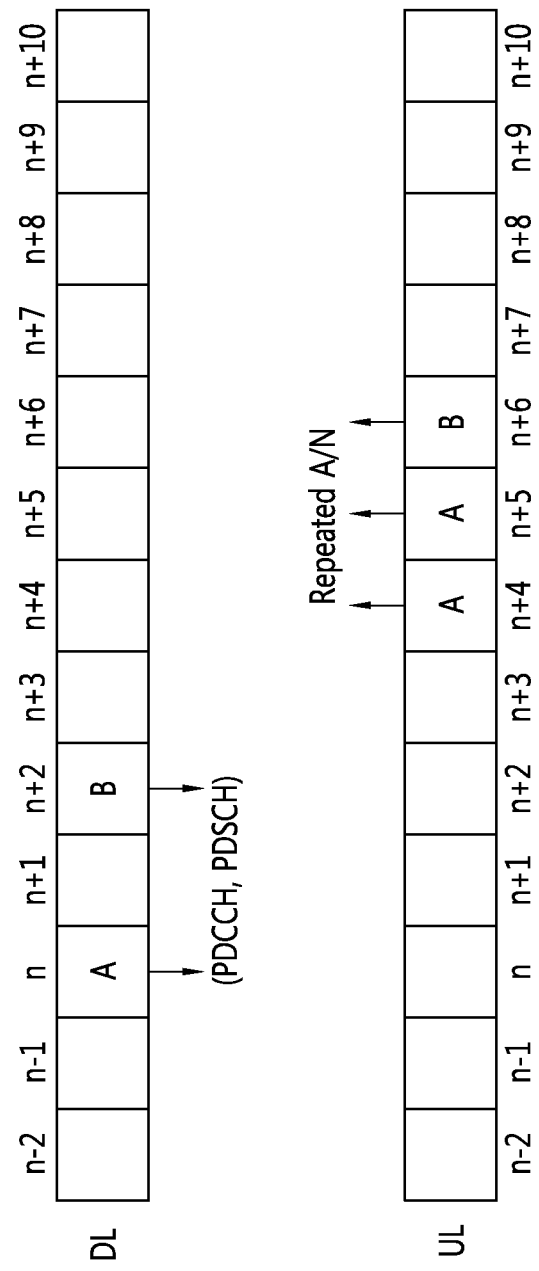
FIG. 18 shows an A/N transmission method according to another embodiment of the present invention.

FIG. 18 shows an A/N transmission method according to another embodiment of the present invention. In a situation of FIG. 16, even if the A/N repetition is configured, the A/N repetition stops when a plurality of A/Ns are transmitted in a specific UL subframe. In an overlapped subframe, A/N for a subsequence TB is transmitted, and transmission of the repeated A/N is discarded.

If the TB B is not scheduled in a subframe n+2, A/N for the TB A is transmitted in subframes n+4, n+5, and n+6. However, if the TB B is received in the subframe n+2, the transmission of the repeated A/N in the subframe n+6 stops, and A/N for the TB B is transmitted.

Figure 19:
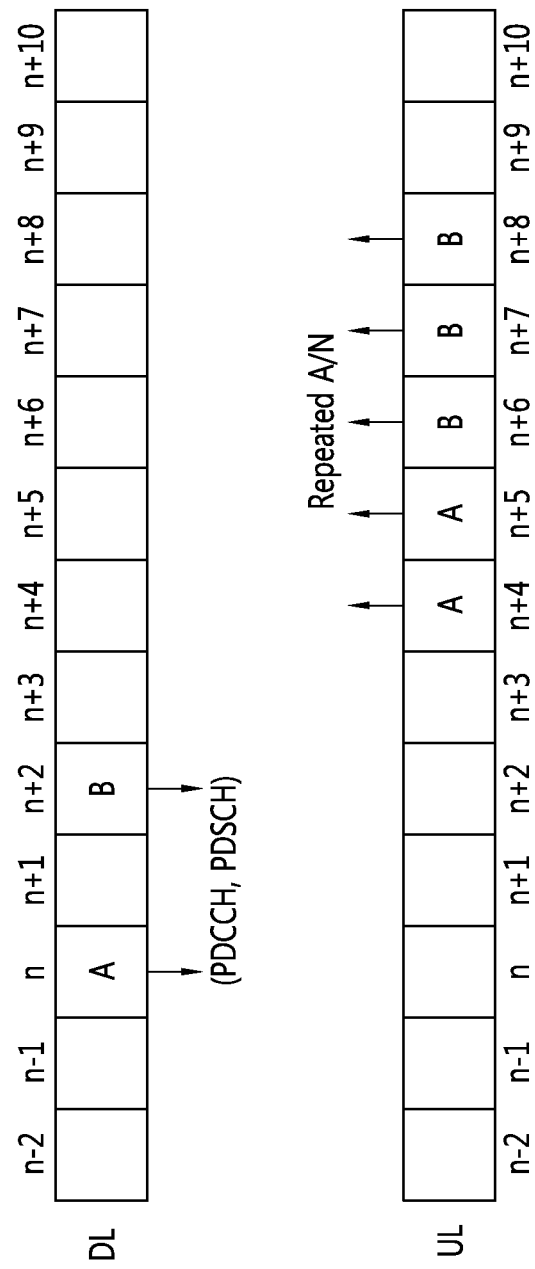
FIG. 19 shows an A/N transmission method according to another embodiment of the present invention.

FIG. 19 shows an A/N transmission method according to another embodiment of the present invention. In comparison with the embodiment of FIG. 18, an A/N repetition is configured to a TB B in this case.

Figure 20:
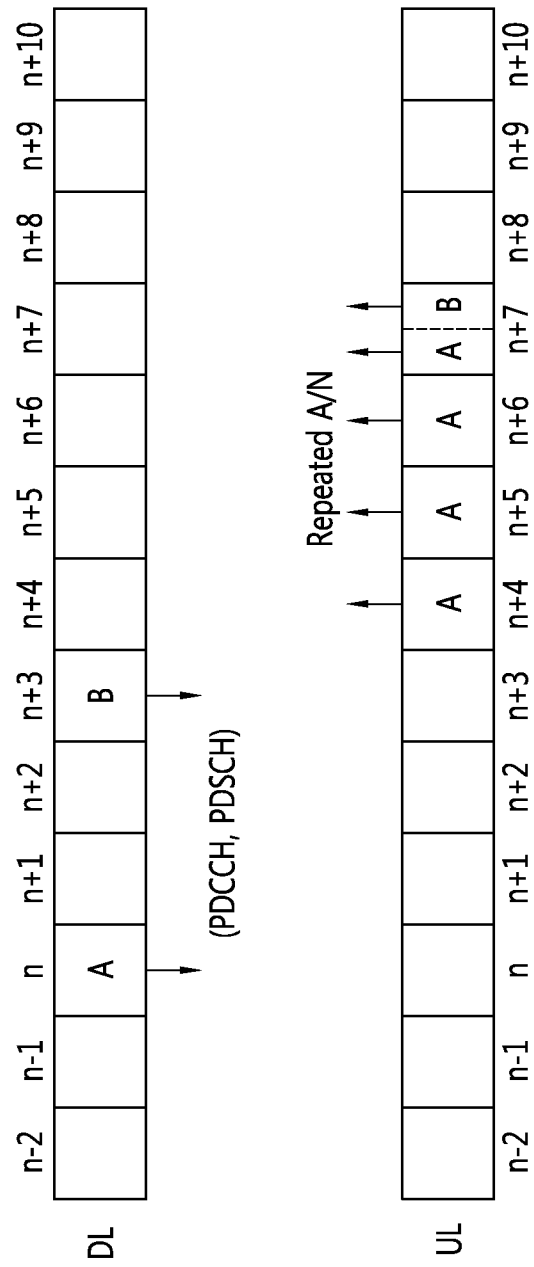
FIG. 20 shows an A/N transmission method according to another embodiment of the present invention.

FIG. 20 shows an A/N transmission method according to another embodiment of the present invention.

This is a case where a repetition count is m=4, scheduling is allowed in a subframe n+3, and scheduling is not allowed in subframes n+1 and n+2. Repeated A/N is not applied to a TB B which is scheduled in the subframe n+3. Even if a PDSCH is not scheduled in the subframes n+1 and n+2, a wireless device may not transmit corresponding A/N.

A TB A is received in a subframe n, and repeated A/N for the TB A is transmitted in subframes n+4, n+5, n+6, and n+7. The TB B is received in the subframe n+3 and A/N for the TB B is transmitted in the subframe n+7.

Two A/Ns are triggered in the subframe n+7, and this is called an overlapped subframe.

Figure 21:
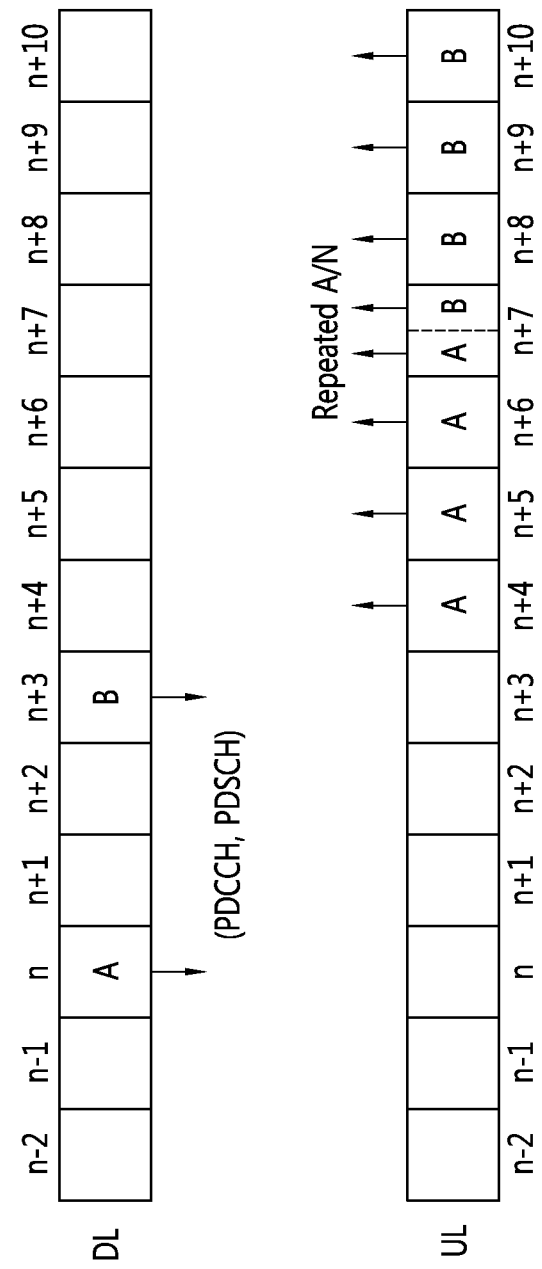
FIG. 21 shows an A/N transmission method according to another embodiment of the present invention.

FIG. 21 shows an A/N transmission method according to another embodiment of the present invention. In comparison with the embodiment of FIG. 20, an A/N repetition is configured to a TB B in this case.

Figure 22:
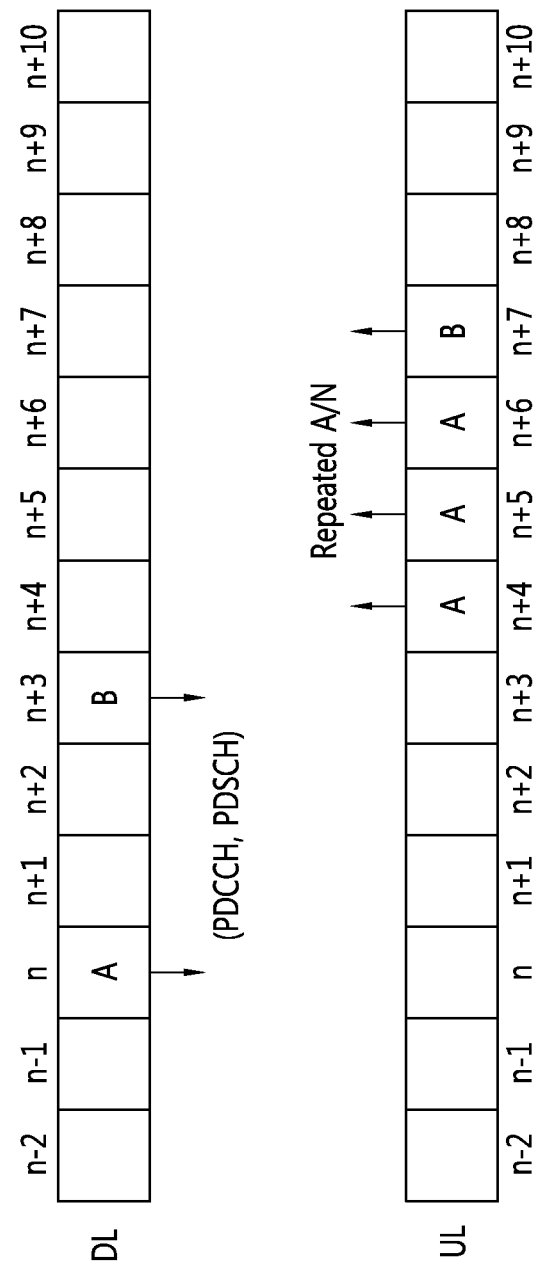
FIG. 22 shows an A/N transmission method according to another embodiment of the present invention.

FIG. 22 shows an A/N transmission method according to another embodiment of the present invention. In a situation of FIG. 20, even if the A/N repetition is configured, the A/N repetition stops when a plurality of A/Ns are transmitted in a specific UL subframe. In an overlapped subframe, A/N for a subsequence TB is transmitted, and transmission of the repeated A/N is discarded.

If the TB B is not scheduled in a subframe n+3, A/N for the TB A is transmitted in subframes n+4, n+5, n+6, and n+7. However, if the TB B is received in the subframe n+3, the transmission of the repeated A/N in the subframe n+7 stops, and A/N for the TB B is transmitted.

Figure 23:
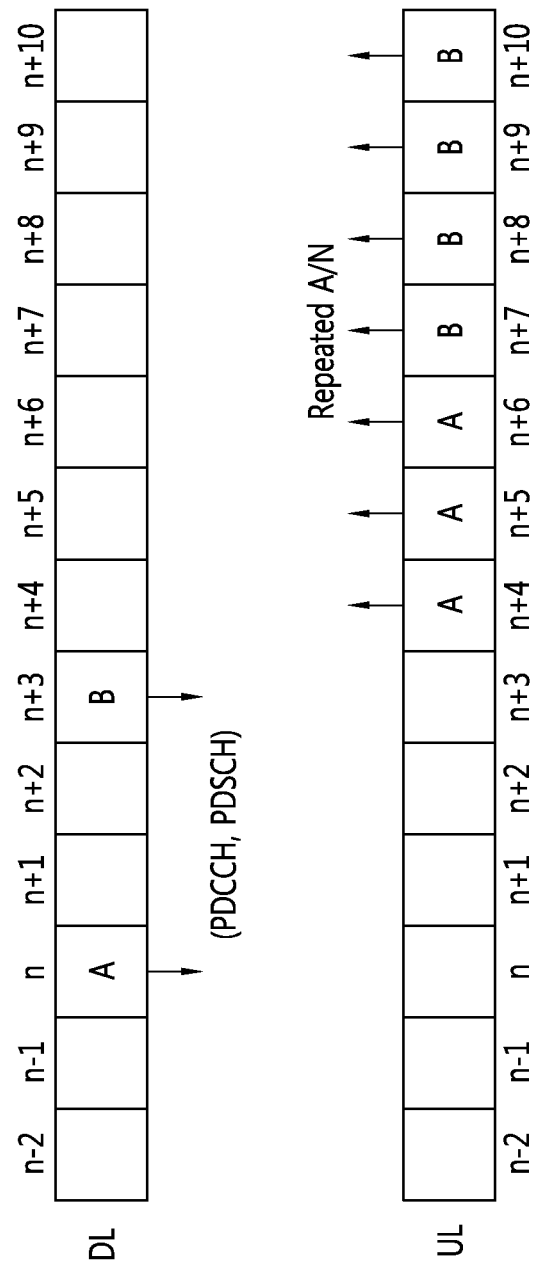
FIG. 23 shows an A/N transmission method according to another embodiment of the present invention.

FIG. 23 shows an A/N transmission method according to another embodiment of the present invention. In comparison with the embodiment of FIG. 22, an A/N repetition is configured to a TB B in this case.

Figure 24:
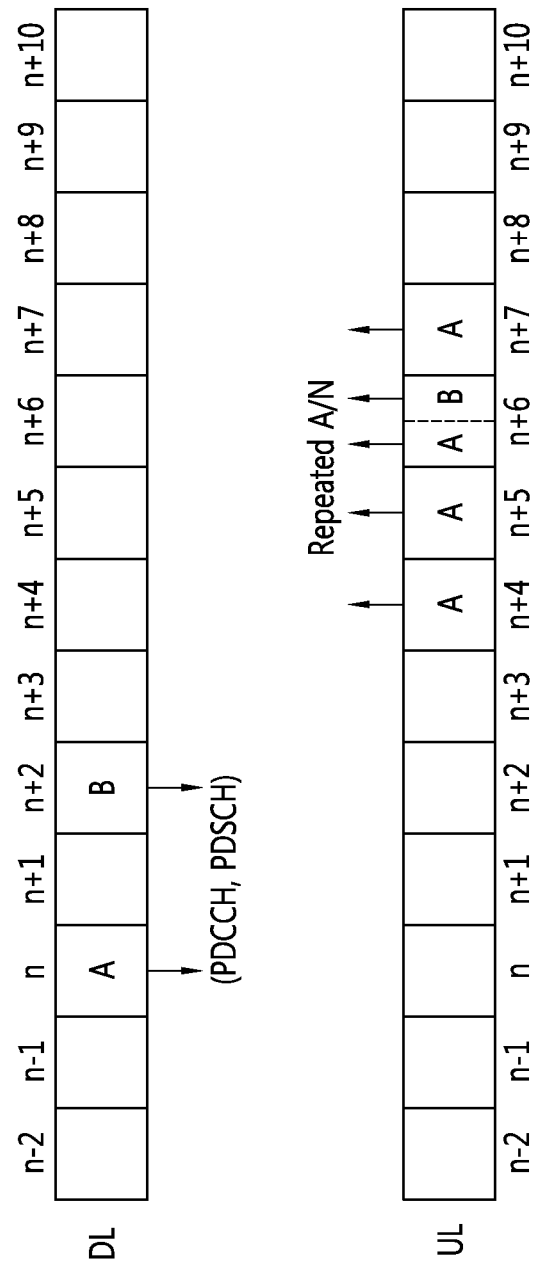
FIG. 24 shows an A/N transmission method according to another embodiment of the present invention.

FIG. 24 shows an A/N transmission method according to another embodiment of the present invention.

This is a case where a repetition count is m=4, scheduling is allowed in a subframe n+2, and scheduling is not allowed in subframes n+1 and n+3. Repeated A/N is not applied to a TB B which is scheduled in the subframe n+2.

A TB A is received in a subframe n, and repeated A/N for the TB A is transmitted in subframes n+4, n+5, n+6, and n+7. The TB B is received in the subframe n+2 and A/N for the TB B is transmitted in the subframe n+6.

Two A/Ns are triggered in the subframe n+6, and this is called an overlapped subframe.

Figure 25:
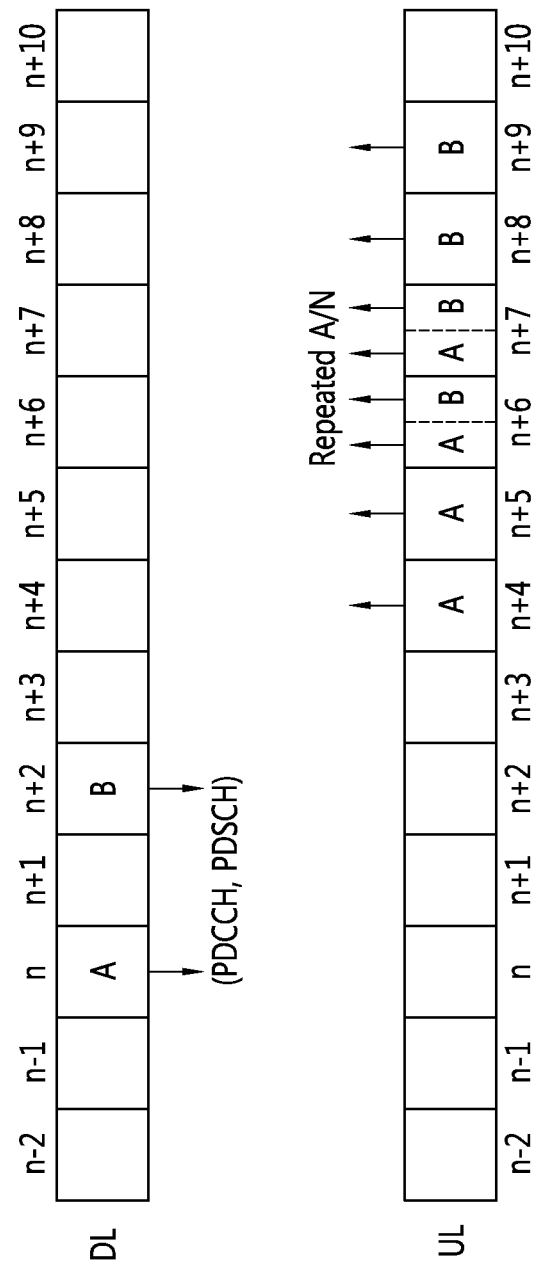
FIG. 25 shows an A/N transmission method according to another embodiment of the present invention.

FIG. 25 shows an A/N transmission method according to another embodiment of the present invention. In comparison with the embodiment of FIG. 24, an A/N repetition is configured to a TB B in this case.

Subframes n+6 and n+7 are overlapped subframes. In the overlapped subframe, two PUCCH resources A/N for a TB A and A/N for a TB B may be reserved.

Figure 26:
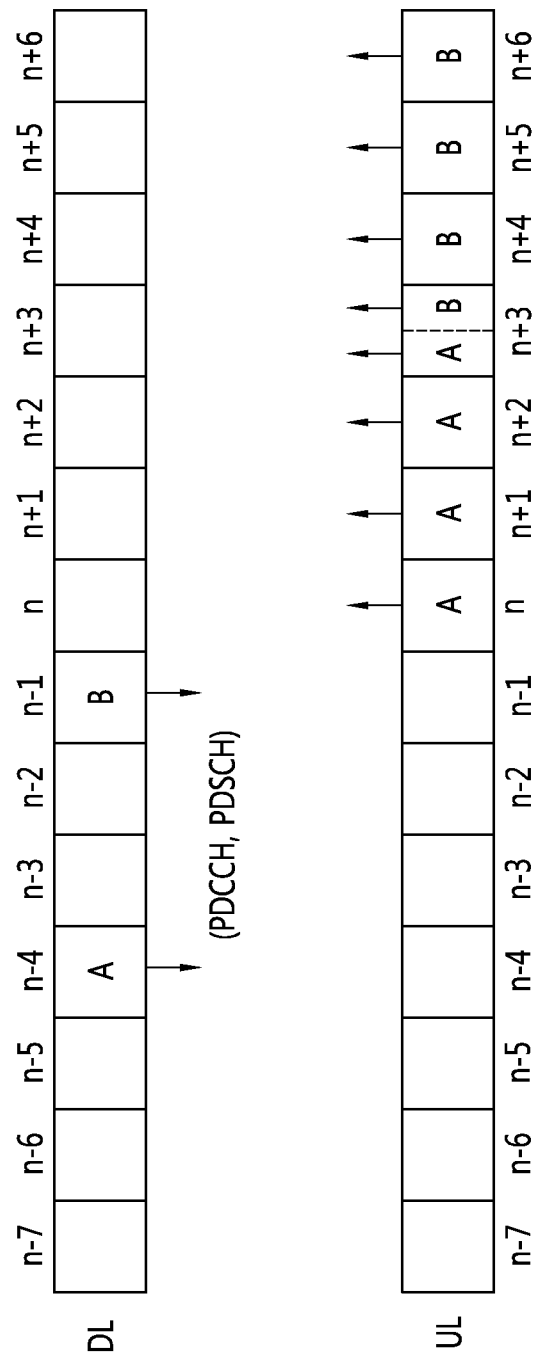
FIG. 26 shows an A/N transmission method according to another embodiment of the present invention.

FIG. 26 shows an A/N transmission method according to another embodiment of the present invention. A subframe index of the embodiment of FIG. 21 is reconfigured in this case.

Repeated A/N for a TB A received in a subframe n−4 is transmitted in subframes n, n+1, n+2, and n+3. A/N is not transmitted for a TB corresponding to A/N to be transmitted in a previous subframe (i.e., the subframes n, n+1, and n+2) of a last subframe (i.e., the subframe n+3) in which the repeated A/N is transmitted among TBs received after the TB A. Even if a TB is received in subframes n−3 and n−2, a wireless device does not transmit A/N. If a TB B is received in the subframe n−2, repeated A/N for the TB B is transmitted starting from the subframe n+3.

Figure 27:
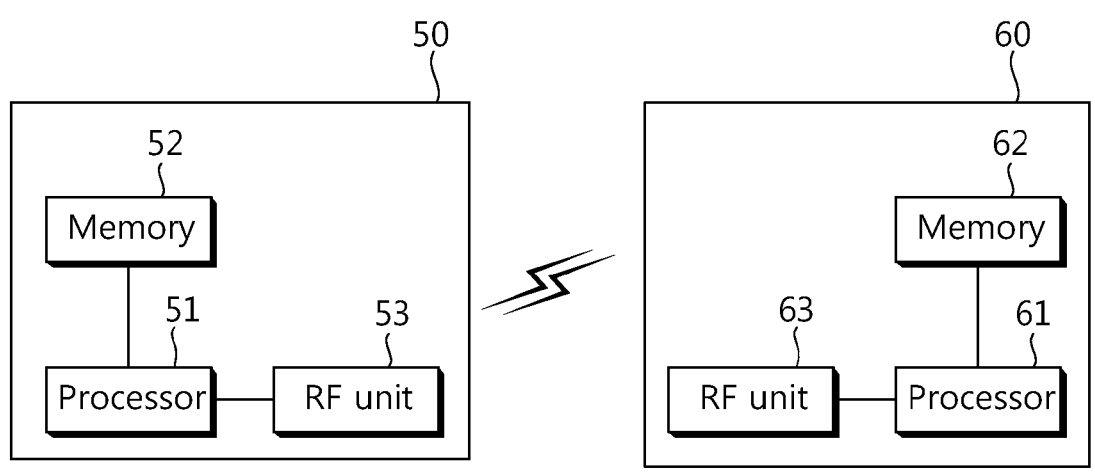
FIG. 27 is a block diagram showing a wireless communication system according to an embodiment of the present invention.

FIG. 27 is a block diagram showing a wireless communication system according to an embodiment of the present invention.

A BS 50 includes a processor 51, a memory 52, and a radio frequency (RF) unit 53. The memory 52 coupled to the processor 51, and stores various instructions executed by the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51. The processor 51 may configure an EPDCCH/PDCCH, and may transmit an EPDCCH/PDCCH/PDSCH. The processor 51 may support an HARQ operation, and may receive HARQ A/N.

A wireless device 60 includes a processor 61, a memory 62, and an RF unit 63. The memory 62 is coupled to the processor 61, and stores various instructions performed by the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61. The processor 61 may transmit HARQ A/N.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of transmitting hybrid automatic repeat request (HARQ) positive acknowledgement (ACK)/ negative acknowledgement (NACK) in a wireless communication system, the method comprising:
receiving, by a wireless device from a base station, information regarding a repetition count m of the HARQ ACK/NACK and a repetition count p of a designated signal, where m is an integer greater than 1 and p is an integer greater than 0;
receiving, by the wireless device from the base station, a downlink transport block;
transmitting, by the wireless device to the base station, the designated signal p times; and
repeatedly transmitting, by the wireless device to the base station, an ACK/NACK for the downlink transport block (m−p) times,
wherein the designated signal is transmitted across p consecutive subframes and the ACK/NACK is transmitted across (m−p) consecutive subframes.

2. The method of claim 1, wherein, if decoding of the downlink transport block is not completed within a given time, the designated signal is transmitted.

3. The method of claim 1, wherein, if a size of the downlink transport block is greater than a specific value, the designated signal is transmitted.

4. The method of claim 1, wherein, if a size of a timing advance (TA) is greater than a specific value, the designated signal is transmitted.

5. The method of claim 4, wherein the designated signal is transmitted in a first subframe among the p consecutive subframes.

6. The method of claim 1, wherein the designated signal and the ACK/NACK are transmitted on a physical uplink control channel (PUCCH).

7. The method of claim 6, wherein a resource for the PUCCH is predetermined by the base station.

8. The method of claim 1, wherein the designated signal indicates a NACK irrespective of whether or not decoding of the downlink transport block is successful.

9. A wireless device for transmitting hybrid automatic repeat request (HARQ) positive acknowledgement (ACK)/ negative acknowledgement (NACK) in a wireless communication system, the device comprising:
a radio frequency (RF) unit configured to transmit and receive a radio signal; and
a processor operatively coupled to the RF unit and configured to:
receive, from a base station, information regarding a repetition count m of the HARQ ACK/NACK and a repetition count p of a designated signal, where m is an integer greater than 1 and p is an integer greater than 0;
receive a downlink transport block from the base station;
transmit the designated signal p times to the base station; and
repeatedly transmit an ACK/NACK for the downlink transport block (m−p) times to the base station,
wherein the designated signal is transmitted across p consecutive subframes and the ACK/NACK is transmitted across (m−p) consecutive subframes.

10. The wireless device of claim 9, wherein, if decoding of the downlink transport block is not complete within a given time, the designated signal is transmitted.

11. The wireless device of claim 9, wherein, if a size of the downlink transport block is greater than a specific value, the designated signal is transmitted.

12. The wireless device of claim 9, wherein the designated signal indicates a NACK irrespective of whether or not decoding of the downlink transport block is successful.

* * * * *